United States Patent
Puehlhorn

[19]

[11] Patent Number: 5,803,561
[45] Date of Patent: Sep. 8, 1998

[54] ASSEMBLY MADE FROM DOVE TAIL PANELS AND THE METHOD OF ASSEMBLING

[76] Inventor: Richard J. Puehlhorn, P.O. Box 358, Loch Sheldrake, N.Y. 12759

[21] Appl. No.: 787,949

[22] Filed: Jan. 23, 1997

[51] Int. Cl.⁶ ..................................................... A47B 47/04
[52] U.S. Cl. ....................... 312/264; 312/263; 312/265.5; 312/265.6
[58] Field of Search .................................. 312/263, 264, 312/265.5, 265.6, 195, 257.1

[56] References Cited

U.S. PATENT DOCUMENTS

| 256,328 | 4/1882 | Kade | 312/263 |
|---|---|---|---|
| 305,286 | 9/1884 | Campbell | 312/263 |
| 920,095 | 4/1909 | Stephens | 312/265 |
| 2,801,895 | 8/1957 | Gass | 312/257.1 |
| 3,674,328 | 7/1972 | White et al. | 312/263 |
| 3,989,156 | 11/1976 | Lowry | 312/263 X |
| 4,632,040 | 12/1986 | Sheffer | 312/195 X |
| 4,750,794 | 6/1988 | Vegh | 312/263 |
| 4,880,284 | 11/1989 | Dickson et al. | 312/263 |

FOREIGN PATENT DOCUMENTS

| 926356 | 9/1947 | France | 312/257.1 |

*Primary Examiner*—Peter R. Brown
*Assistant Examiner*—David E. Allred

[57] ABSTRACT

A piece of furniture has side panels, each having a front and rear dove tail shaped vertical channel. A channel access aperture is positioned proximate a lower end of each channel. Lower support members are coupled between the side panels using dove tail shaped ends. A front panel having dove tail shaped ends is slidably coupled between the front dove shaped channels of the side panels. A rear panel is positioned between the rear channels. Two tipper support members having dove tail shaped ends are coupled between the side panels in similar fashion to the lower support members. A top panel having bracing members with dove tail shaped ends is positioned atop the side panels such that the bracing member ends are positioned within dove tail shaped brace receivers in the side panels.

3 Claims, 3 Drawing Sheets

ASSEMBLY MADE FROM DOVE TAIL PANELS AND THE METHOD OF ASSEMBLING

BACKGROUND OF THE INVENTION

1. Field of the Invention

The present invention relates to assemblies made from dove-tail panels and more particularly pertains to a new Assembly Made From Dove Tail Panels And The Method Of Assembling for allowing easy and effortless construction of a line of furniture that does not require the use of tools or adhesive.

2. Description of the Prior Art

The use of assemblies made from dove-tail panels is known in the prior art. More specifically, assemblies made from dove-tail panels heretofore devised and utilized are known to consist basically of familiar, expected and obvious structural configurations, notwithstanding the myriad of designs encompassed by the crowded prior art which have been developed for the fulfillment of countless objectives and requirements.

Known prior art assemblies made from dove-tail panels include U.S. Pat. No. 4,042,307; U.S. Pat. No. 4,867,598; U.S. Pat. No. 272,038; U.S. Pat. No. 4,249,355; U.S. Pat. No. 3,991,535 and U.S. Pat. No. 4,025.215.

While these devices fulfill their respective, particular objectives and requirements, the aforementioned patents do not disclose a new Assembly Made From Dove Tail Panels And The Method Of Assembling. The inventive device includes a male dove-tail section and a female dove-tail section.

In these respects, the Assembly Made From Dove Tail Panels And The Method Of Assembling according to the present invention substantially departs from the conventional concepts and designs of the prior art, and in so doing provides an apparatus primarily developed for the purpose of allowing easy and effortless construction of a line of furniture that does not require the use of tools or adhesive.

SUMMARY OF THE INVENTION

In view of the foregoing disadvantages inherent in the known types of assemblies made from dove-tail panels now present in the prior art, the present invention provides a new Assembly Made From Dove Tail Panels And The Method Of Assembling construction wherein the same can be utilized for allowing easy and effortless construction of a line of furniture that does not require the use of tools or adhesive.

The general purpose of the present invention, which will be described subsequently in greater detail, is to provide a new Assembly Made From Dove Tail Panels And The Method Of Assembling apparatus and method which has many of the advantages of the assemblies made from dove-tail panels mentioned heretofore and many novel features that result in a new Assembly Made From Dove Tail Panels And The Method Of Assembling which is not anticipated, rendered obvious, suggested, or even implied by any of the prior art assemblies made from dove-tail panels, either alone or in any combination thereof.

To attain this, the present invention generally comprises a male dove-tail section and a female dove-tail section.

There has thus been outlined rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Assembly Made From Dove Tail Panels And The Method Of Assembling apparatus and method which has many of the advantages of the assemblies made from dove-tail panels mentioned heretofore and many novel features that result in a new Assembly Made From Dove Tail Panels And The Method Of Assembling which is not anticipated, rendered obvious, suggested, or even implied by any of the prior art assemblies made from dove-tail panels, either alone or in any combination thereof.

It is another object of the present invention to provide a new Assembly Made From Dove Tail Panels And The Method Of Assembling which may be easily and efficiently manufactured and marketed.

It is a further object of the present invention to provide a new Assembly Made From Dove Tail Panels And The Method Of Assembling which is of a durable and reliable construction.

An even further object of the present invention is to provide a new Assembly Made From Dove Tail Panels And The Method Of Assembling which is susceptible of a low cost of manufacture with regard to both materials and labor, and which accordingly is then susceptible of low prices of sale to the consuming public, thereby making such Assembly Made From Dove Tail Panels And The Method Of Assembling economically available to the buying public.

Still yet another object of the present invention is to provide a new Assembly Made From Dove Tail Panels And The Method Of Assembling which provides in the apparatuses and methods of the prior art some of the advantages thereof while simultaneously overcoming some of the disadvantages normally associated therewith.

Still another object of the present invention is to provide a new Assembly Made From Dove Tail Panels And The Method Of Assembling for allowing easy and effortless construction of a line of furniture that does not require the use of tools or adhesive.

Yet another object of the present invention is to provide a new Assembly Made From Dove Tail Panels And The Method Of Assembling which includes a male dove-tail section and a female dove-tail section.

Still yet another object of the present invention is to provide a new Assembly Made From Dove Tail Panels And The Method Of Assembling that provides a line of furniture that can be easily assembled by interlocking dove-tail pieces into grooved receiving means.

Even still another object of the present invention is to provide a new Assembly Made From Dove Tail Panels And The Method Of Assembling that teaches a method of assembling furniture that does not require any tools or adhesives.

These together with other objects of the invention along with the various features of novelty which characterize the invention, are pointed out with particularity in the claims annexed to and forming a part of this disclosure. For a better understanding of the invention its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
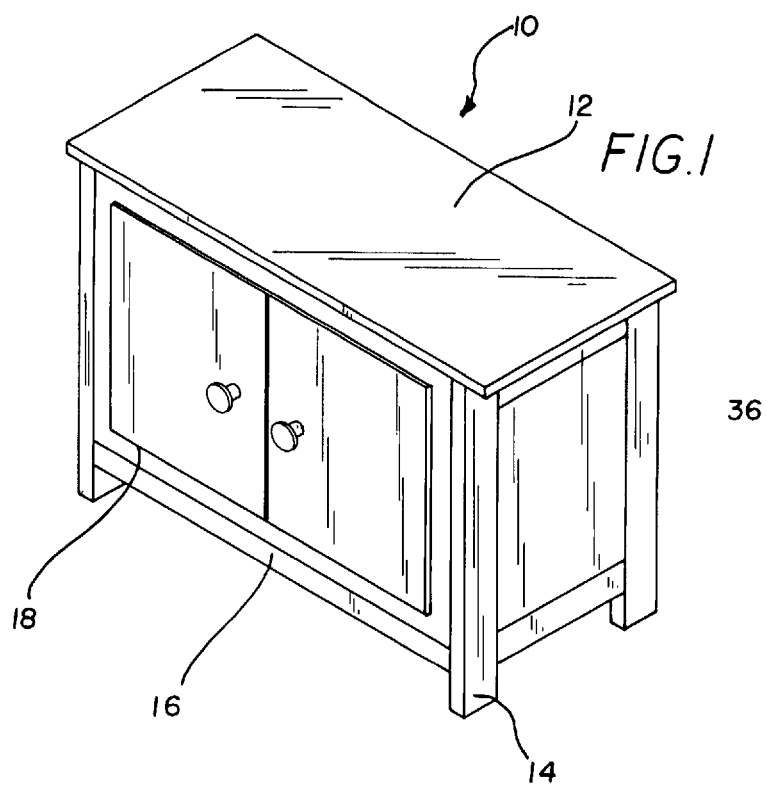
FIG. 1 is a side perspective view of a new Assembly Made From Dove Tail Panels.
Figure 2:
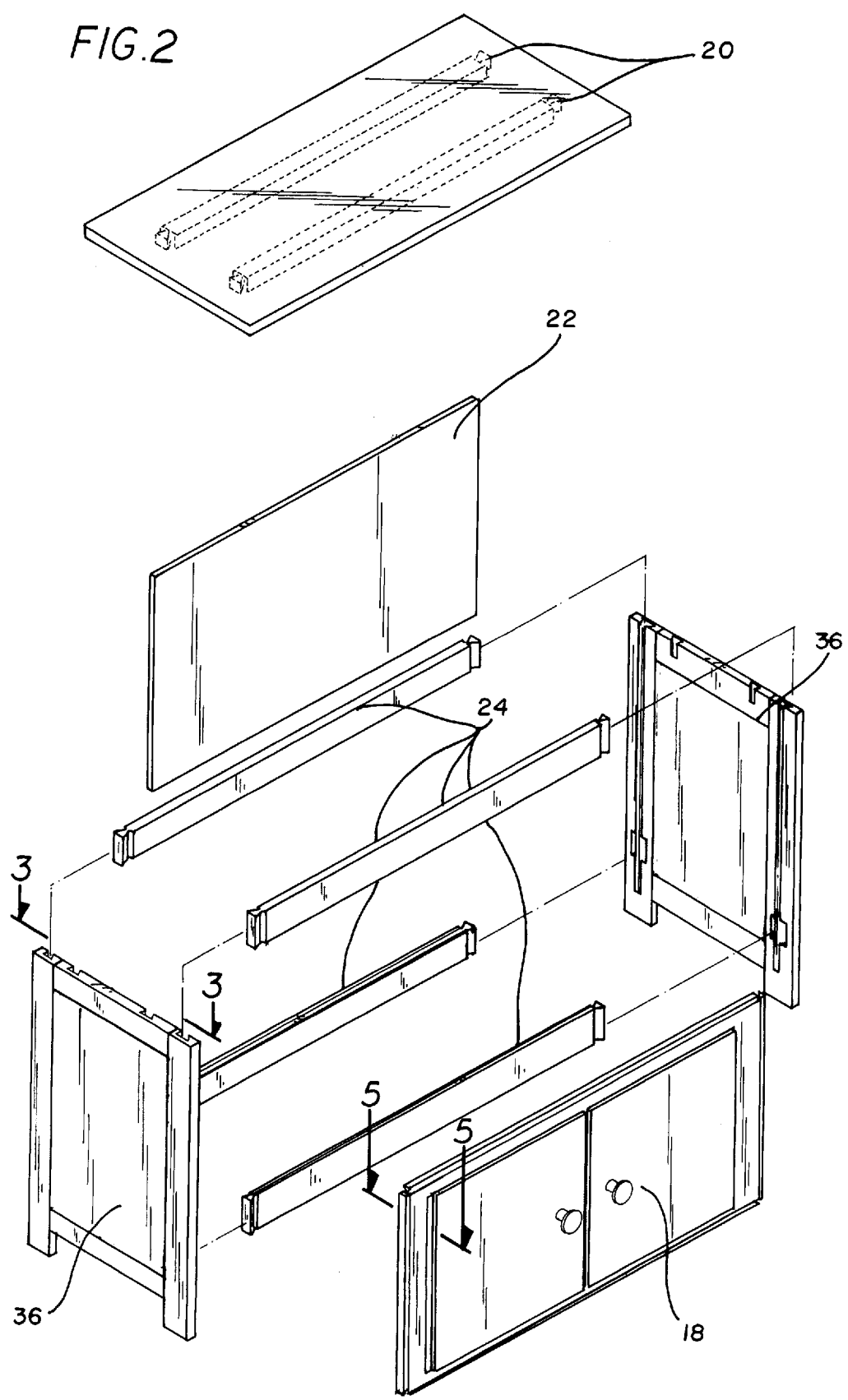
FIG. 2 is an exploded view of the present invention.
Figure 3:
FIG. 3 is a cross sectional view taken along line 3—3 of FIG. 2.
Figure 4:
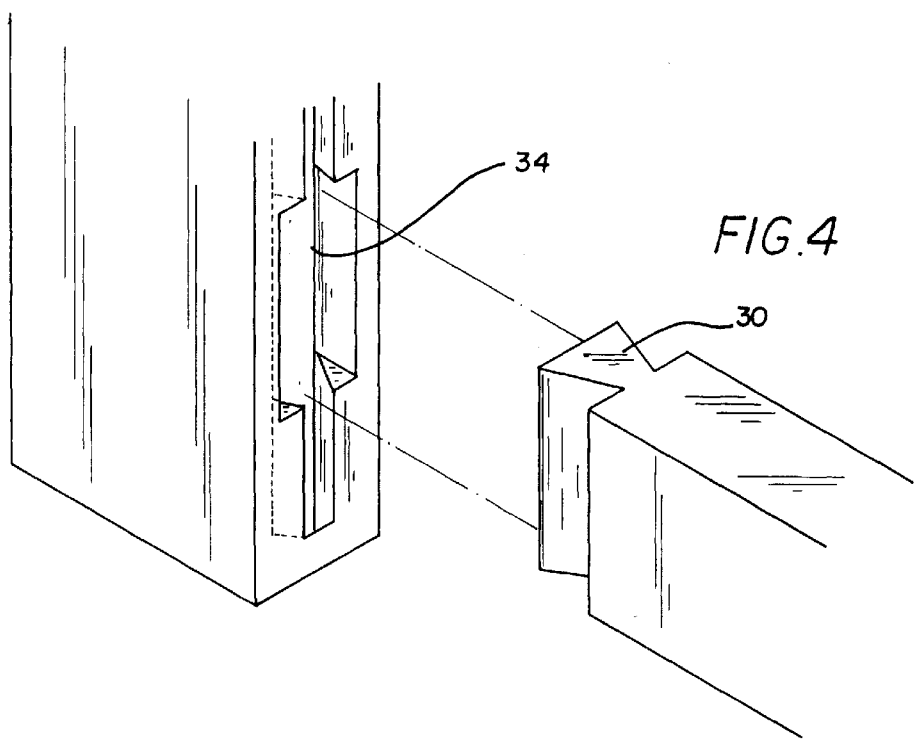
FIG. 4 is an isometric view of a male and female dove-tail parts.
Figure 5:
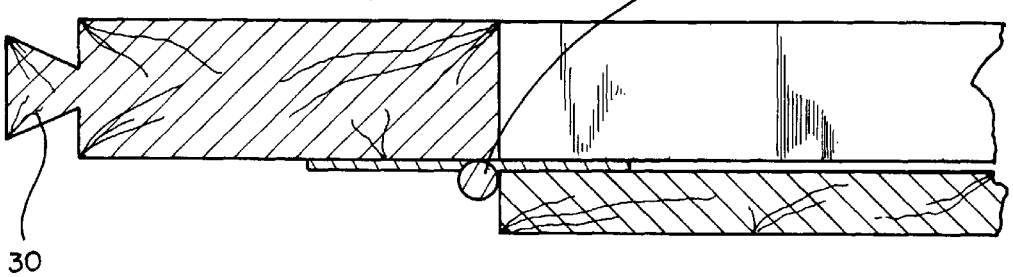
FIG. 5 is cross sectional view taken along line 5—5 of FIG. 2.

With reference now to the drawings, and in particular to FIGS. 1 through 5 thereof, a new Assembly Made From Dove Tail Panels And The Method Of Assembling embodying the principles and concepts of the present invention and generally designated by the reference numeral 10 will be described.

More specifically, it will be noted that the Assembly Made From Dove Tail Panels And The Method Of Assembling 10 comprises a male dove-tail section and a female dove-tail section.

As best illustrated in FIGS. 1 through 5, it can be shown that the present invention teaches a novel nonobvious invention which is useful in the industry.

An Assembly Made From Dove Tail Panels And The Method Of Assembling 10 which includes generally, furniture parts made from a male dove-tail section 30 which removably connects with a female dove-tail section 34. The male dove-tail section 30 forms an angular protrusion comprising three sides and the female dove-tail section 34 is adapted to fit the male dove-tail section 30 forming a slot to receives the male dove-tail section 30. The male dove-tail section 30 slides into its interlocking position and the panels form a piece of furniture. The furniture comprises a table top 12, slidably fitted to a first leg 14 and a second leg 16. The first leg 14 and the second leg 16 are held in position by at least four leg supports 24, in the rear of the furniture, a back panel 22 slidably engages with the legs 14, 16. In the front, a pair of doors 18 slidably engages with the legs 14, 16, and on the sides the side panels 36 form a relationship with the legs 14, 16. The door 18 generally include at least a pair of hinges 32. The furniture is completed by a table top 12 which forms a slidable attachment with the legs 14 16, wherein the furniture comprises a material selected from the group consisting of plastic and wood.

This invention further includes The Method Of Assembling the furniture which comprises, slidably attaching the leg supports to the first and second legs, attaching, the back panel, the bottom shelf and the side panels to the first and second legs and sliding the table top into position.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A piece of furniture comprising:

a first and a second side panel, each side panel having a front dove tail shaped vertical channel and a rear dove tail shaped vertical channel, each channel having an upper end and a lower end and a channel access aperture positioned proximate said channel lower end;

a first lower support member having dove tail shaped ends, each first lower support member end coupled to a respective said side panel front channel such that said first lower support member is positioned between said side panels, the dove tail ends of said first lower support member being positioned at the lower end of the front channel of each of said side panels;

a second lower support member having dove tail shaped ends, each second lower support member end coupled to a respective said side panel rear channel such that said second lower support member is positioned between said side panels and substantially horizontally parallel to said first lower support member, the dove tail ends of said second lower support member being positioned at the lower end of the rear channel of each of said side panels;

a front panel having dove tail shaped vertical ends and at least one door, each front panel end coupled to a respective said side panel front channel such that said front panel is positioned between said side panels and resting on said first lower support member;

a rear panel having ends, each rear panel end coupled to a respective side panel rear channel such that said rear panel is positioned between said side panels and opposite said front panel and resting on said second lower support member;

a first upper support member having dove tail shaped ends, each first upper support member end coupled to a respective said side panel front channel such that said first upper support member is positioned between said side panels and resting on said front panel;

a second upper support member having dove tail shaped ends, each second upper support member end coupled to a respective said side panel rear channel such that said second upper support member is positioned between said side panels and resting on said rear panel; and a top panel having a front bracing member and a rear bracing member, said front bracing member having dove tail shaped ends, each front bracing member end coupled to a respective dove tail shaped front brace receiver space from said front vertical channels in said first and said second side panels, said rear bracing member having dove tail shaped ends, each rear bracing member end coupled to a respective dove tail shaped rear brace receiver spaced from said rear vertical channels in said first and said second side panels, said top panel further resting on and being supported by said first and second upper support members.

2. A piece of furniture as in claim 1, wherein the piece of furniture is made of a material selected from the group consisting of plastic and wood.

3. A piece of furniture as in claim 1, wherein each side panels includes a number of legs extending downwardly from said side panel.

\* \* \* \* \*